Inventor
James R. Grider.
By his Attorneys

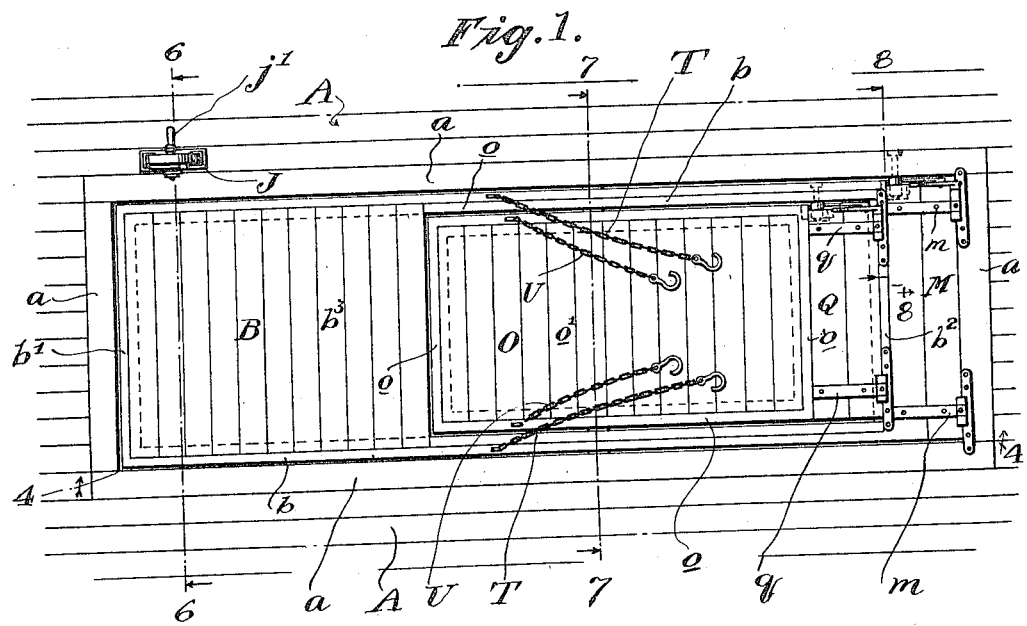
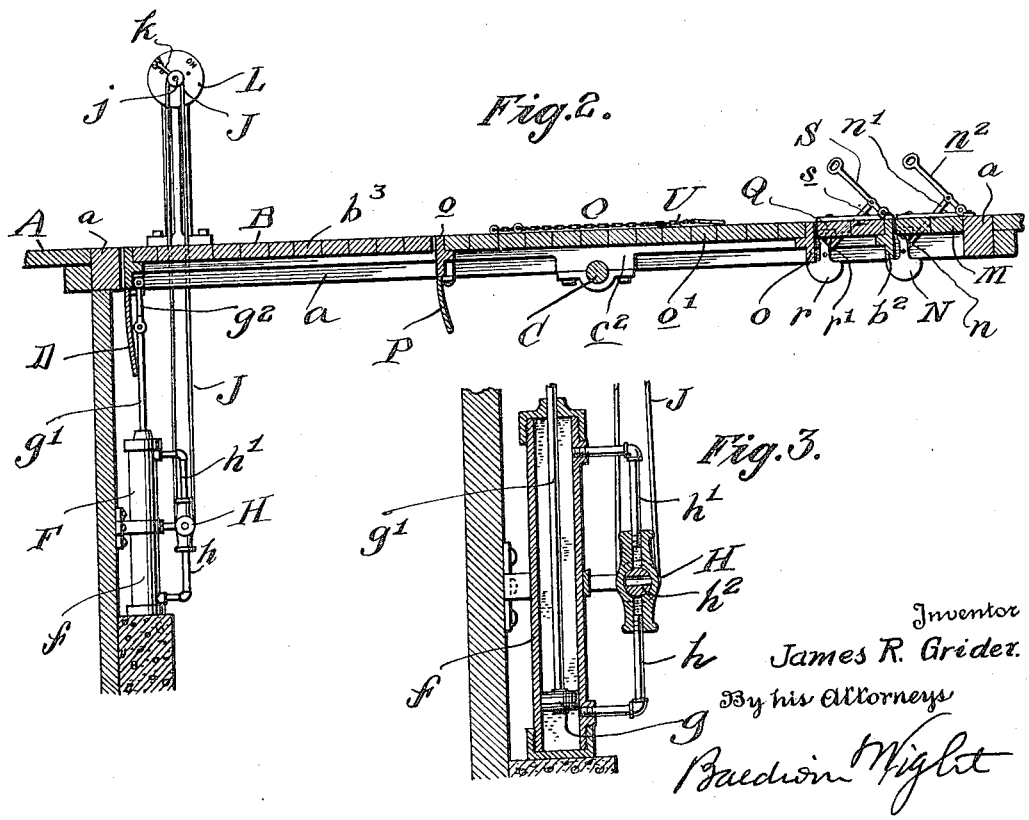

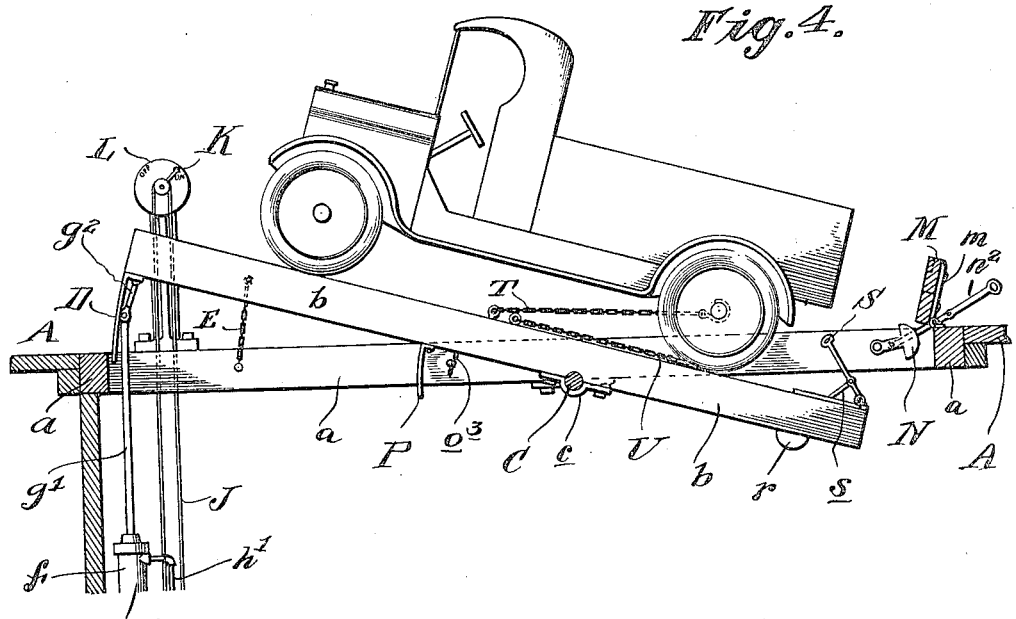
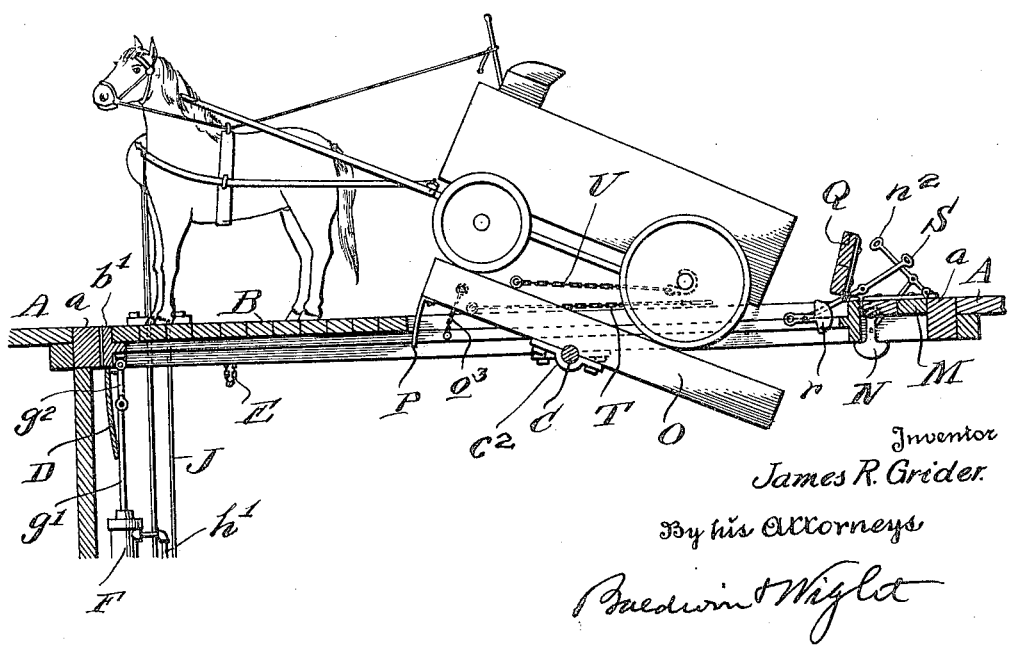

UNITED STATES PATENT OFFICE.

JAMES R. GRIDER, OF ROACHDALE, INDIANA.

VEHICLE-DUMP.

1,383,934. Specification of Letters Patent. Patented July 5, 1921.

Application filed April 19, 1920. Serial No. 375,025.

*To all whom it may concern:*

Be it known that I, JAMES R. GRIDER, a citizen of the United States, residing at Roachdale, in the county of Putnam and State of Indiana, have invented certain new and useful Improvements in Vehicle-Dumps, of which the following is a specification.

This invention relates to tipples or dumping platforms of the kind used in warehouses or at grain elevators and at other places for supporting and tipping a truck or wagon in such manner that it may discharge its contents into a suitable receiver or place for storage or for transport, and the object of my invention is to provide a tipple of simple construction which may be easily operated and which may be employed for dumping either wagons or trucks.

Briefly stated, my invention comprises a combination truck and wagon dump which is automatically operated by the weight of the truck or wagon to tilt the tipple or platform when it is desired to unload the vehicle.

In carrying out my invention I provide a relatively large truck supporting platform which is pivoted to move about a horizontal axis, and which carries within its limits a relatively small platform for supporting and dumping a cart or wagon and which is also mounted to move about a horizontal axis independently of any movement given to the truck platform. The outer platform, which I call the truck platform, is of such size as to accommodate large trucks, and it is moved up and down about its axis within a frame in the floor of the warehouse or other place for storage. At its front end, this platform is provided with a guard or shield, and chains are provided for limiting the upward movement of the front end of the platform while being tilted. The wagon platform is pivoted to move about the same horizontal axis as the truck platform, and it is provided with a guard or shield at its front end and chains are provided for limiting its movement while being tilted. The truck platform is provided at its rear end with a door secured to hinges and held in closed position by a latch carried by the frame of the platform. The latch is connected to a lever by means of which it may be opened. In this way an opening may be provided to receive material from a cart or wagon without tilting the truck platform.

The frame surrounding the truck platform may, in general, be of any suitable construction, but in rear of the truck platform it is provided with a door secured to hinges and held in closed position by a latch operated by a lever, the arrangement being such that the door may be opened to allow the passage of material from a truck without opening the trap door of the wagon platform.

In order to hold the truck platform in its tilted position and to control the speed of said platform while being moved, I connect the front end of said platform with a dash pot provided with valve mechanism which may be so controlled as to hold the platform in tilted or closed position, and which may also be adjusted to allow the platform to move about its horizontal axis at the desired speed.

In the accompanying drawings:—

Figure 1 is a plan view of a combined truck and wagon dump embodying my improvements.

Fig. 2 shows a longitudinal section thereof.

Fig. 3 is a detail view in section of the dash pot mechanism.

Fig. 4 is a view in vertical section on the line 4—4 of Fig. 1, showing a truck mounted on the truck platform and ready to discharge its load.

Fig. 5 is a view similar to Fig. 4, showing a wagon on the wagon dumping platform in discharging position.

Figure 6:
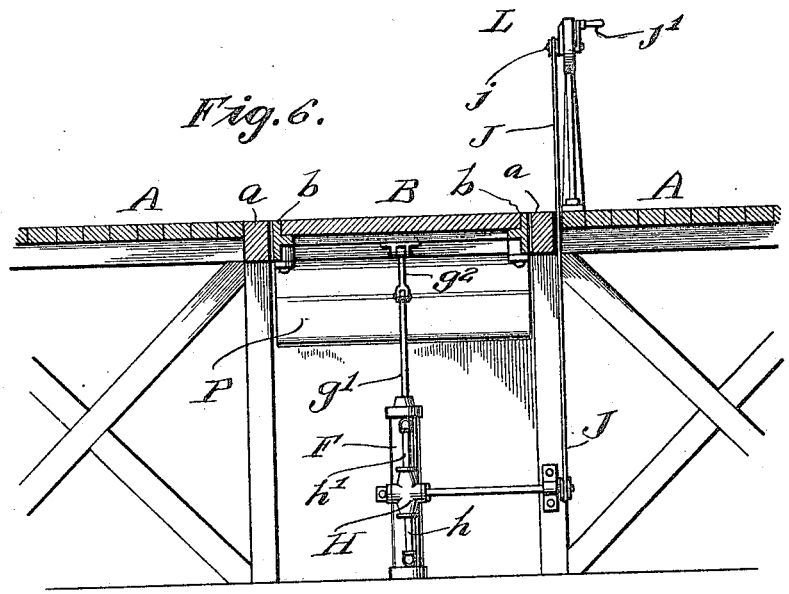
Fig. 6 is a detail view in section on the line 6—6 of Fig. 1, showing the mechanism for controlling the dash pot.

The floor of a warehouse, grain elevator, or other dumping place is indicated at A. This floor has a rectangular opening, which is surrounded by a frame *a*. Within the frame is mounted a dumping platform B of relatively large dimensions and which I call the truck dumping platform. It consists of side frame pieces $b$, a front frame piece $b'$, and a rear frame piece $b^2$. The frame is covered by cross pieces $b^3$ consisting of boards arranged close together and close to the front portion of the platform. The truck dumping platform is supported by a horizontally arranged shaft C held in brackets $c^3$ depending from the floor A and extending through brackets $c$ depending from the frame pieces $b$. At its front end the platform carries a shield or guard D which serves to prevent objects of any kind from passing through the opening at the front when the platform is tilted. A chain E attached to the frame $a$ and to the platform B limits the movement of the platform when it is tilted. The front end of the platform B is connected to a dash pot F which serves to control the movement of the platform. The dash pot as indicated in Fig. 3 comprises a cylinder $f$ which is filled with oil or other fluid and in this cylinder operates a piston $g$, the rod $g'$ of which is connected at its upper end to the platform B by a link $g^2$. The upper and lower portions of the cylinder are connected by pipes $h$, $h'$ to a valve casing H containing a rotary valve $h^2$ which is operated by a band J passing over a pulley $j$ operated by a handle $j'$. The shaft of the pulley carries a pointer K moving over the index L, showing the words "Off" and "On." By operating the handle the valve $h^2$ may be suitably moved. When the platform is depressed as shown in Fig. 2, the valve is closed and the piston is in the lower end of the cylinder. When the platform is tilted by the weight of the truck and the valve $h^2$ is opened, the fluid passes from the upper end of the cylinder $f$ through the valve $h^2$ and to the lower end of the cylinder. As the discharge of the fluid is slow, the movement of the platform is made correspondingly slow. When the platform is tilted as indicated at Fig. 4, the valve $h^2$ may be closed and thereafter the platform will be held in its tilted position. When it is desired to move the platform to its normal horizontal position, the valve $h^2$ may be opened and inasmuch as the front end of the truck carrying the engine is heavy and the front portion of the platform on one side of the axis of the shaft C is relatively long, the platform will be lowered by the weight of the truck. By regulating the valve $h^2$, this downward movement of the front end of the platform may be made slow and thus shocks are prevented.

At the rear end of the frame $a$ in rear of the truck platform, there is a trap door M which is connected with the frame by hinges $m$. Fig. 2 shows the trap door in closed position and it is held in this position by a latch N pivoted at $n$ to the door and engaging at its lower end with the frame piece $b^2$ of the truck platform. The latch is connected by a link $n'$ to a lever $n^2$ by means of which it may be released and by which the trap door may be opened in the manner indicated in Fig. 4. This latch also serves to hold the rear end of the platform B in a horizontal position.

Figure 7:
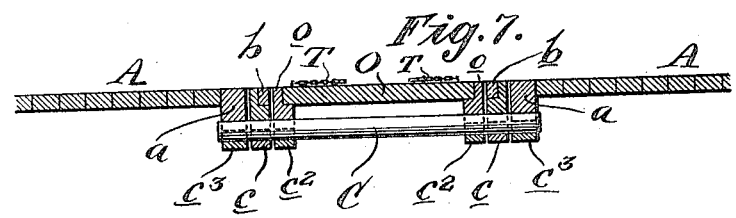
Fig. 7 shows a transverse section on the line 7—7 of Fig. 1.
Figures 8, 9:
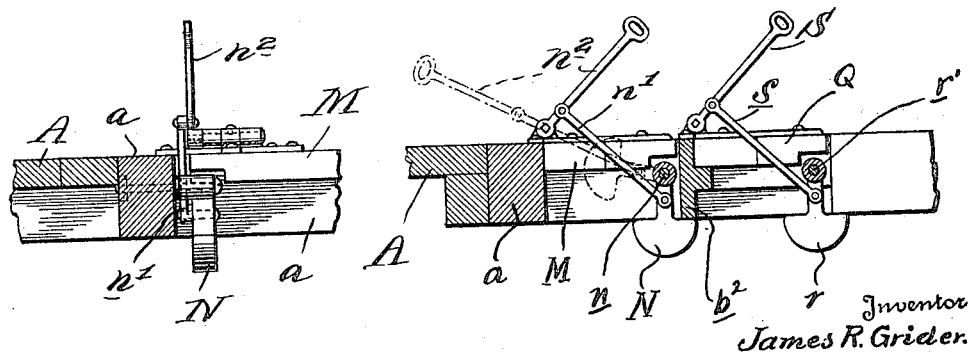
Fig. 8 is a detail view in section on the line 8—8 of Fig. 1.
Fig. 9 is a detail sectional view showing the latch mechanism and the lever mechanism for opening and closing the trap doors.

The wagon dumping platform O is of smaller dimensions than the truck platform. It comprises frame pieces $o$ and a covering of boards $o'$ which completely close the frame. The wagon platform is pivoted on the shaft C in the manner shown in Fig. 7, said shaft passing through brackets or hangers $c^2$ depending from the frame pieces $o$. The wagon platform may be moved about the axis of the shaft C independently of any movement given to the truck platform, but said wagon dumping platform moves simultaneously with the truck dumping platform when the latter is moved.

At its front end the platform O is provided with a shield or guard P similar to the shield or guard D before referred to, and the upward movement of said wagon dumping platform is limited by a chain $o^3$. The wagon platform is considerably shorter than the truck platform, its front end being a considerable distance from the front edge of said truck platform as shown in Fig. 1. The floor $b^3$ of the truck platform affords a place where the draft animal of the wagon may stand, as indicated in Fig. 5. The rear end of the wagon platform terminates a short distance from the rear frame piece $b^2$ of the truck platform, as shown most clearly in Fig. 2. Between the rear end of the wagon platform and the rear frame piece $b^2$ is located a trap door Q which is connected by hinges $q$ with the frame piece $b^2$ and is held in closed position by a latch $r$ pivoted at $r'$ to the door Q and adapted to engage the rear frame piece $o$ of the wagon platform. This latch $r$ is connected by a link $s$ with a lever S by means of which the latch may be released and the trap door opened. The latch also seems to hold the wagon platform in a horizontal position.

When a truck is to be dumped, it is driven onto the platform B, the rear wheels resting on the platform O, while the front wheels rest on the platform B, the parts being in the condition shown in Fig. 2. Before the trap door M is opened, the tail board of the truck may be lifted and then the lever $n^2$ is operated to release the latch N and to swing back the trap door M, the latch and door being held in the position shown in Fig. 4. At this time the door Q is not open. The truck platform may be held in the position shown in Fig. 4 by the chain or chains T and the platform is prevented from tilting too far by means of the chain or chains E. The dash pot mechanism also serves to hold the platform in tilted position when the valve $h^2$ is closed. When the truck is relieved of material, its front end carrying the engine is heavier than the rear end and the leverage from the shaft C to the front end of the platform is greater so that by opening the valve $h^2$ the front end of the platform is allowed to lower slowly without shock, the chains T may be released, and the truck may pass forward.

When a wagon comes to the dumping place it is made to rest on the platform O when the latter with the truck platform is in the position shown in Figs. 1 and 2. At this time the horse may stand on the front part of the truck platform, as shown in Fig. 5. At this time the door M is not open, but the trap door Q which is located within the truck platform is opened by means of the lever S in the manner indicated in Fig. 5. Before this door is opened, however, the attendant may stand on the door and lift the tail board of the wagon or otherwise open its rear end. After the door Q is opened and the rear end of the wagon platform has been released, the latter is tilted automatically in the manner shown, the wagon being held in place by the chains U. In this case the dash pot does not operate, not being connected with the platform O. The tilting movement of the wagon platform is limited by the chain or chains $o^3$. After the wagon is unloaded, its front end may be pressed downward, thus bringing the platform back to its horizontal position and the shaft may be attached to the horse or draft animal.

It will be observed that the truck platform turns about a horizontal axis which is nearer to the rear end of the platform than to the front end, while the wagon platform turns about an axis which is slightly nearer to the front end than to the rear end. By providing a trap door in the floor which may be opened to permit material to pass from a truck to a receptacle and a separate trap door mounted in the truck platform, either trucks or wagons may be accommodated so that material will pass therefrom freely to its destination. By reference to Fig. 5 it will be seen that if only the trap door M were provided, material would not pass from a wagon through the floor, and on the other hand, if only the trap door Q were provided, material would not properly pass through the floor from a truck. It will be further observed that the platforms operate automatically by the weight of the vehicle.

An important feature of the invention is providing the dash pot mechanism above referred to, because in the case of heavy trucks the return of the platform would sometimes be sudden and cause severe shocks unless provision were made to prevent them.

I claim as my invention:—

1. A vehicle dump, comprising a floor, a truck-dumping platform mounted therein to turn about a horizontal axis, a wagon-dumping platform mounted within the truck-dumping platform to turn about a horizontal axis, a trap door within the truck-dumping platform and in rear of the wagon-dumping platform, another trap door mounted in the floor in rear of the truck-dumping platform and in rear of the trap door first mentioned, and means for separately raising and lowering said trap doors.

2. A vehicle dump comprising a floor, a truck dumping platform mounted therein to turn about a horizontal axis, a wagon dumping platform mounted within the truck dumping platform to turn about a horizontal axis, a trap door within the truck dumping platform and in rear of the wagon dumping platform, and means for opening and closing said trap door.

3. A vehicle dump comprising a floor, a truck dumping platform mounted therein to turn about a horizontal axis, a wagon dumping platform mounted within the truck dumping platform to turn about the same axis, a trap door attached to the truck dumping platform in rear of the wagon dumping platform, a latch for holding the truck dumping platform in a horizontal position, and lever mechanism for operating the latch and for opening the trap door.

4. A vehicle dump, comprising a floor, a truck-dumping platform mounted therein to turn about a horizontal axis, a wagon-dumping platform mounted within the truck-dumping platform to turn about a horizontal axis, a trap door within the truck-dumping platform and in rear of the wagon-dumping platform, another trap door in the floor in rear of the truck-dumping platform, a chain connected with the front end of the truck dumping platform and with the floor frame for limiting the tilting movement of the truck-dumping platform, and a chain connected with the frame of the truck-dumping platform and with the wagon-dumping platform to limit the movement of said wagon-dumping platform.

5. A vehicle dump, comprising a floor, a truck-dumping platform mounted therein to turn about a horizontal axis, a wagon-dumping platform mounted within the truck dumping platform to turn about a horizontal axis independently of the truck dumping platform, and chains carried by the wagon-dumping platform adapted to be attached to a wagon for limiting the rearward movement of the wagon when either of the platforms is tilted.

6. A vehicle dump, comprising a floor, a platform pivoted to move about a horizontal axis disposed in rear of its middle portion, a dash-pot connected with the front end of the platform, a pipe connecting the upper and lower ends of the dash-pot, a valve in said pipe, means for holding the valve in closed position when the platform is tilted, and means for opening the valve to permit the platform to slowly lower by the superior gravity in the front portion of the platform in advance of the axis about which it turns.

In testimony whereof, I have hereunto subscribed my name.

JAMES R. GRIDER.